Feb. 9, 1926. 1,572,575
W. TAYLOR
OPTICAL INSTRUMENT
Filed August 31, 1921
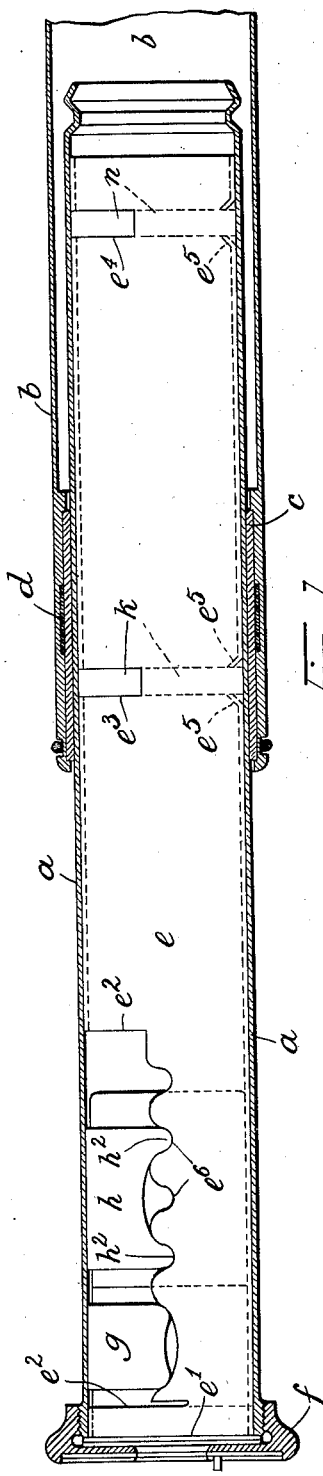
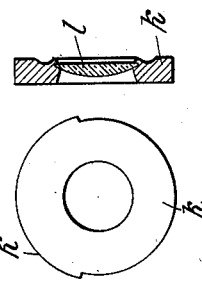
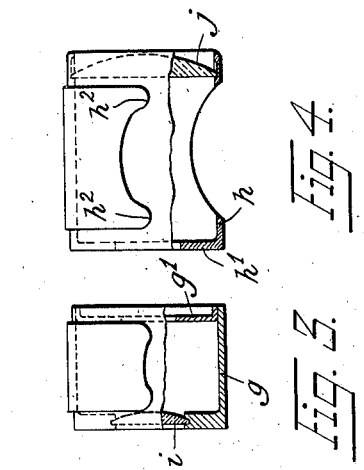
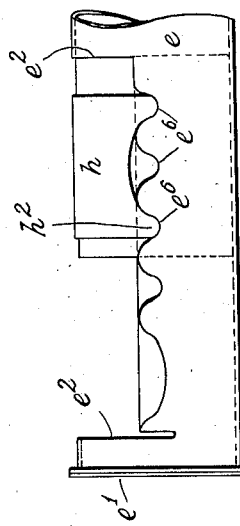
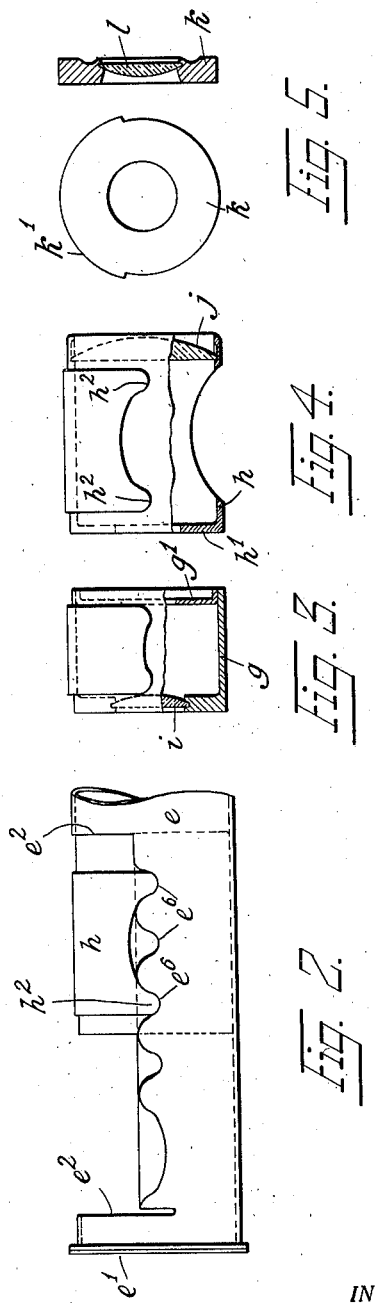
INVENTOR.
William Taylor
BY
Arthur L. Kent
his ATTORNEY.

Patented Feb. 9, 1926.

1,572,575

UNITED STATES PATENT OFFICE.

WILLIAM TAYLOR, OF LEICESTER, ENGLAND.

OPTICAL INSTRUMENT.

Application filed August 31, 1921. Serial No. 497,293.

(GRANTED UNDER THE PROVISIONS OF THE ACT OF MARCH 3, 1921, 41 STAT. L., 1313.)

*To all whom it may concern:*

Be it known that I, WILLIAM TAYLOR, a citizen of Great Britain, residing at Leicester, in the county of Leicestershire, England, have invented certain new and useful Improvements in Optical Instruments, for which I have obtained Letters Patent of Great Britain, numbered 105,247, dated March 1, 1916, and Letters Patent of France, numbered 484,608, dated February 26, 1917, and which are fully described and represented in the following specification and the accompanying drawings, forming a part of the same.

My invention relates to optical instruments which have removably fitted lenses or other optical elements, and holders or containers with seatings into which the elements can be placed transversely into operative position. Hitherto, in the best kinds of optical instruments, it has been usual to fit the lenses or elements in frames or cells, having screw threads by which they may be removably attached to and positioned in a holder or container, which may be either the body of the instrument or a separate member adapted to be secured thereto. Sometimes for the purpose of varying the power of such an instrument a lens cell has been so pivoted to the instrument body that it can be displaced at will through an aperture formed in the side wall of the body and in a plane normal to the axis thereof and thereby moved into and out of operative position or the line of sight. In spectacles used for testing eyesight it is usual to fit the lenses in metal rims and to place them transversely into seatings formed in the trial frames.

The present invention consists in improvements in the mounting of a lens or other optical element or elements in the better kinds of optical instrument, whereby the removable attachment of such elements can be effected with greater precision of position than heretofore, and with considerable saving of time in both the manufacture and use of the instrument. According to the invention, a holder or container for a lens or other optical element, is furnished with means adapted to co-operate with a cell containing the element, for positioning the element centrally, squarely, and longitudinally within the container, and for retaining it therein.

Hereinafter the term "element" is to be understood as including any cell or rim with which the element may be fitted.

The invention may be applied with advantage to a telescope, and I shall describe it with reference to the accompanying drawing, in which:

Fig. 1 is a longitudinal section of a portion of such an instrument, two draw tubes forming part of the telescope body or mounting, an eye piece, and a pair of erecting lenses being shown;

Fig. 2 is an elevation of a portion of a separate container for carrying the eye piece and erecting lenses, one of the cells being shown in an alternative position;

Figs. 3 and 4 are side views of two cells for the eye-lenses which are secured in the cells in any suitable manner, the cells being also provided with diaphragms; and Fig. 5 comprises an end view and section of a cell for an erecting lens. In the several figures corresponding parts are denoted by the same reference letters.

In Fig. 1 $a$ is one of the draw tubes constituting the body of a telescope and $b$ is a second draw tube, a suitable friction sliding joint, comprising a lining $c$ and a pressure spring $d$, being interposed between the co-operating parts of the two draw tubes which are rigid. Such tubes and friction joint do not, however, constitute any part of the present invention.

In Figs. 1 and 2, $e$ is a tubular container shown in elevation adapted to carry the eye-piece and erecting lenses. The container forms a removable lining to the smaller draw tube $a$ and is provided with a flange $e^1$ abutting against the end of the draw tube $a$ and held thereto by a screwed cap $f$ which forms an eye-cap for the telescope.

The cells $h$ and $g$, shown in Figs. 3 and 4, hold, respectively, the low power and additional high power lenses of the eye-piece. Cell $g$ is provided with a diaphragm $g^1$ and carries a lens $i$, while cell $h$ has a diaphragm $h^1$ and carries a lens $j$. Fig. 5 shows a cell $k$ for holding an erecting lens $l$.

In the side wall of the container $e$, which, as shown, has a cylindrical bore adapted to form seatings for the optical elements, are cut apertures such as $e^2$, $e^3$, $e^4$, through which the elements can be placed transversely into their respective operative positions. When the container containing the elements is then inserted in the draw-tube $a$ which encircles it, the elements are thereby positively prevented from being withdrawn from the container. I hereinafter term a tube such as $a$ or any equivalent means of positively retaining an element within its container a "positive retaining means". The tube $a$ serves also as a light-excluding means for excluding stray light from the container.

In order that an element may be positioned centrally within the container, I form the element or its cell with a circular or part circular peripheral edge which is concentric with the axis of the element and is adapted to position the element by being seated in its seating within the container.

In order that the elements may be positioned squarely within the container, that is to say, that the axis of the element shall lie in the required direction, I may, as for example in the case of the cell $h$ Figs. 2 and 4, form its exterior surface which seats in the seating within the container, cylindrically or part cylindrically, such cylinder having a length at least equal to one diameter of such cylinder, to ensure that when it lies in a seating of equal or greater length in the container it shall thereby be positioned squarely as well as centrally. Alternatively, as for example in the case of the cell shown in Fig. 5 as having a part cylindrical rim of relatively short length, I may position the cell squarely within the container by making the slot in the container to receive the cell substantially without longitudinal shake, so that the sides of the slot form abutments to position the element squarely; and in addition, I may form a buttress or buttresses, such for example as $e^5$, within the container to engage the side or sides of that part of the edge of the cell which lies within the container and is not positioned by the side of the slot, and any such additional buttress, as in the example shown, may be formed by shearing or pressing a lug inwardly from the wall of the tubular container $e$ or in other convenient manner. The part $k^1$ of the cell $k$ which, when the cell is seated within the container lies in the mouth of the slot $e^4$, may be shaped so that it lies flush with the exterior of the container in order both so that it may be positioned squarely by the sides of the slot, and that when the container is placed within a draw-tube $a$ or its equivalent, withdrawal of the cell from the container is prevented.

The arrangement just described for positioning the cell $k$ and its element $l$ squarely within the container serves also to position it longitudinally within the container. Alternatively, and particularly when the length of a cell bearing in its seating within the container is sufficient to position it squarely, I may employ as means for positioning the element longitudinally, a notch or notches, such as $e^6$, Figs. 1 and 2, which may be formed, for example, in a terminal or longitudinal edge of the slot in such manner as to engage a corresponding projection or projections provided for this purpose on the edge of the cell or element. Such projections are for example shown at $h^2$ in Fig. 4, and in Fig. 2 the cell is shown in one of its operative positions in the container, while in Fig. 1 it is shown as having been moved longitudinally into an alternative operative position for the purpose of varying the power of the telescope. Alternatively, the notch may be on the cell and the projection on the edge of the slot.

An additional lens which is required for raising the power of the telescope, is contained in the cell $g$ which is provided on its edge with projections adapted to engage a larger notch formed in the edge of the slot $e^2$ which is made long enough to contain both the cells $h$ and $g$. It will be seen that owing to the difference of form of the notches in the edge of the slot $e^2$ which are adapted to engage the cells $h$ and $g$ respectively, it is impossible to place either cell in the container in the position proper to the other one. Moreover, as the notches are formed in one edge only of the said slot, neither of the cells can be seated in the container wrong way round.

In order to prevent transposal of the field lenses in the slots $e^3$ and $e^4$, these slots and the cells which fit them are made of different thicknesses, and it will thus be seen that it is impossible under these circumstances, to assemble the elements in wrong order in the container.

Each cell and slot may also have a letter or sign marked upon it to indicate the proper place and direction of the cell.

In addition to the retaining tube $a$ it is desirable to provide resilient means for retaining the elements within the container. Such means should be adapted to yield when an element is inserted and thereafter to press upon the element to retain it in position. While a separate resilient retaining means may be provided, it is preferable to utilize the resiliency of the containing tube $e$, and for this purpose the slots are cut to a depth somewhat less than the radius of the containing tube $e$, so that the cells which fit the interior bore of the tube are thus obliged, while being inserted, to spring open the tube slightly, and are afterwards held in place by the closing of the wall of the tube which thus encircles more than their semi-circumference.

When such resilient retaining means are provided, the positive retaining tube *a* may in some cases be dispensed with.

By means of my method of mounting the elements in the container, the power of an instrument may be easily changed by removing, adding or transposing one or more elements, and for this or other purposes a slot or opening in the containing tube may be of such length that an element can be moved along its seating by sliding it endways, manually, or by means of a spring.

What is claimed is:

1. An optical instrument, comprising an inner tubular container having a lateral opening, a removable optical element adapted to be inserted through said opening transversely into operative position in the container having a cylindrically curved surface engaging the inner surface of the container opposite said opening and having a projecting portion extending into said opening and lying flush with the outer surface of the container, and an outer tube slidably engaging the tubular container and having its inner surface in engagement with said projecting portion to retain the optical element in the container.

2. An optical instrument, comprising a resilient inner tubular container having a lateral opening extending less than half way around its periphery, a removable optical element adapted to be inserted through said opening transversely into operative position in the container having a cylindrically curved surface engaging the inner surface of the container opposite said opening and retained in engagement therewith by resilient pressure of the portions of the container wall adjacent the ends of said opening, said optical element having a projecting portion extending into said opening and lying flush with the outer surface of the container, and an outer tube slidably engaging the tubular container and having its inner surface in engagement with said projecting portion to retain the optical element positively in the container.

3. An optical instrument, comprising a resilient tubular container having a lateral opening extending less than half way around its periphery, and a removable optical element adapted to be inserted through said opening transversely into operative position in the container having a cylindrically curved surface engaging the inner surface of the container opposite said opening and retained in engagement therewith by resilient pressure of the portions of the container wall adjacent to the ends of said opening.

4. An optical instrument, comprising a tubular container having a lateral opening, a removable optical element adapted to be inserted through said opening transversely into operative position in the container having a cylindrically curved surface engaging the inner surface of the container opposite said opening and having a projecting portion extending into said opening, and cooperating engaging means formed on the end of said projection and on a terminal edge of said opening respectively and serving to position the optical element longitudinally.

5. An optical instrument, comprising a tubular container having a lateral opening, a removable optical element adapted to be inserted through said opening transversely into operative position in the container having a cylindrically curved surface engaging the inner surface of the container opposite said opening and having a projecting portion extending into said opening, and cooperating engaging means formed on the end of said projection and on a terminal edge of said opening respectively and serving to prevent the optical element from being seated in reverse position in the container 6. An optical instrument, comprising a resilient inner tubular container having a lateral opening extending less than half way around its periphery, a removable optical element adapted to be inserted through said opening transversely into operative position in the container having a cylindrically curved surface engaging the inner surface of the container opposite said opening and retained in engagement therewith by resilient pressure of the portions of the container wall adjacent the ends of said opening, said optical element having a projecting portion extending into said opening and lying flush with the outer surface of the container, and an outer tube slidably engaging the tubular container and having its inner surface in engagement with said projecting portion to retain the optical element positively in the container, the container and the optical element being formed to cause the optical element to be positioned squarely and longitudinally in the container.

7. An optical instrument, comprising a tubular container having a lateral opening, a removable optical element adapted to be inserted through said opening transversely into operative position in the container having a cylindrically curved surface engaging the inner surface of the container opposite said opening, and means for retaining the optical element in position in the container, the cylindrically curved surface of the optical element being of sufficient length to position the element squarely in the container.

In testimony whereof I have hereunto set my hand.

WILLIAM TAYLOR.